Nov. 15, 1966  H. K. MEYER  3,284,880
METHOD OF MAKING AN EXPANDER
Filed July 29, 1963
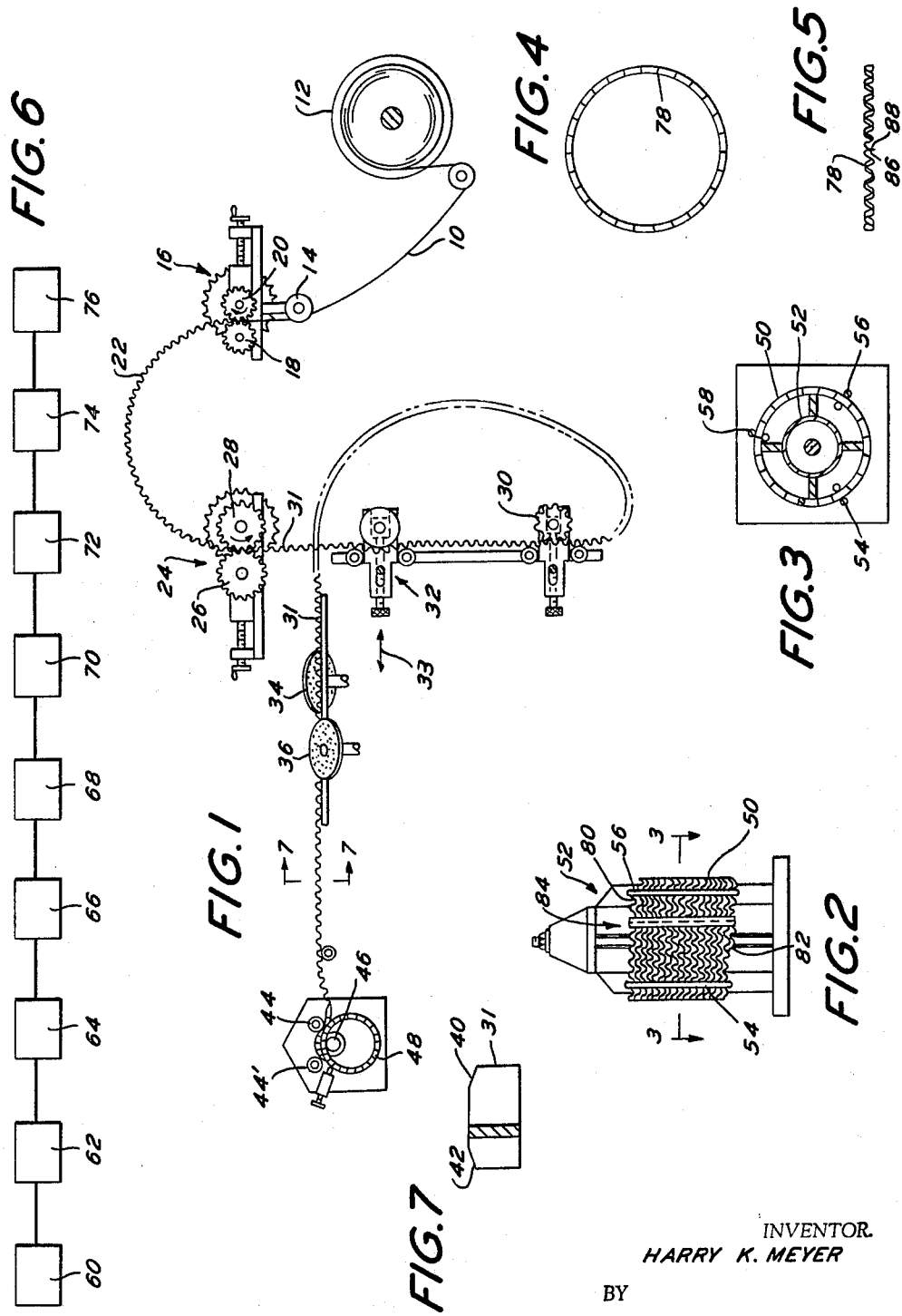
INVENTOR.
HARRY K. MEYER
BY
Arthur H. Seidel
ATTORNEY United States Patent Office 3,284,880
Patented Nov. 15, 1966

3,284,880
METHOD OF MAKING AN EXPANDER
Harry K. Meyer, Swarthmore, Pa., assignor, by mesne assignments, to Gould-National Batteries, Inc., St. Paul, Minn., a corporation of Delaware
Filed July 29, 1963, Ser. No. 298,205
9 Claims. (Cl. 29—156.6)

This invention relates to a method of making an expander, and more particularly, to the method of making an expander adapted to be utilized in a piston ring assembly.

The expander made in accordance with the method of the present invention is a rang-shaped member formed from sinusoidally shaped high carbon steel ribbon adapted to apply a radially outwardly directed biasing force on piston ring members.

In general, the method of the present invention includes shaping the high carbon steel ribbon, or other equivalent material, in two steps, namely a preform and a finish-forming to acquire the desired sinusoidal shape. Thereafter, the sinusoidally shaped wire is stretched to attain the desired pre-opening and to impart permanent set. If desired, the thusly formed sinusoidally shaped wire may have a portion of its peripheral edges ground.

Thereafter, the thusly formed wire is continuously formed into an endless cylinder from which cylinders will be manually cut. The cylinders cut from the endless cylinder will then be arranged on a coiling mandrel to attain the desired diameter and thereafter heat treated. After heat treatment, the cylinders will be longitudinally cut to convert the same into a plurality of individual ring-shaped expanders.

It is an object of the present invention to provide a novel method of making expanders which is simple, reliable and inexpensive.

It is another object of the present invention to provide a novel method for making expanders which are ring-shaped in plan view and sinusoidally shaped in elevation.

It is another object of the present invention to provide a novel method for making a piston ring assembly expander.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a schematic illustration of apparatus utilized during a portion of the method of the present invention.

FIGURE 2 is a side elevation view of a coiling mandrel having a cylinder disposed therearound.

FIGURE 3 is a sectional view taken along the line 3—3 in FIGURE 2.

FIGURE 4 is a top plan view of an expander made in accordance with the method of the present invention.

FIGURE 5 is a side elevation view of the expander in FIGURE 4.

FIGURE 6 is a schematic block diagram of steps in accordance with a portion of the method of the present invention.

FIGURE 7 is a sectional view taken along the line 7—7.

Referring to the drawing in detail, wherein like numerals indicate like elements, there is shown in FIGURE 1 apparatus utilized during a portion of the method of the present invention.

Annealed high carbon steel ribbon 10 is unwound from the spool 12 and fed to the pre-form device 16. Pre-form device 16 includes a pair of sprockets 18 and 20 having teeth on their outer periphery which rough bend the ribbon 10 into a sinusoidally shaped ribbon 22. The ribbon 10 before passing between the sprockets 18 and 20 may extend around an idler 14.

The thusly formed ribbon 22 is then fed to a finish-forming device 24 having sprockets 26 and 28. The outer periphery of the sprockets 26 and 28 is precision machined to provide teeth which bend the ribbon 22 and finish-form the same into sinusoidally shaped ribbon 31. The unwinding of wire ribbon 10 from spool 12 and feeding of the ribbon 22 to the device 24 is effected by the input of rotative power to the sprocket 20. A sprocket 30 which is identical with sprocket 28 is rotatably supported therebelow and driven in the same direction at the same rate of speed. Between the sprockets 28 and 30, the ribbon 31 is stretched to its finished shape and to attain the desired pre-opening and impart permanent set. Stretcher 32 is adapted to be adjusted such as by movement to the left in FIGURE 1 when desired. If too much tension is provided in the resultant expander, the stretcher 32 will be moved toward its zero position. The movement of the stretcher 32 is illustrated by arrow 33.

The ribbon 31 may then be provided with flats 40 and 42 thereby removing the corners at opposite sides of one major face of the ribbon 31 when viewed in elevation, and shown more clearly in FIGURE 7. The flats 40 and 42, when provided, are preferably at a 12° angle and effected by grinding discs 34 and 36 disposed on opposite sides of the ribbon 31.

The thusly formed ribbon 31 is then fed to a coiler which includes grooved rollers 44 and 44' and mandrel 46. The ribbon 31 is twisted 90° from the position it occupied when passing the grinding discs 34 and 36. By passing the ribbon 31 over the mandrel 46 and beneath the rollers 44 and 44', the ribbon 31 is converted into a continuously forming endless cylindrical coil of the ribbon 48. Periodically, an operator cuts a portion of the continuously forming endless cylindrical coil of the ribbon 48 thereby providing a cylindrical coil of the ribbon 50. The thusly formed cylindrical coil of ribbon 50 will hereinafter be generally referred to as "cylinder 50." Such cutting operation may be accomplished in any convenient manner such as by using conventional wire cutters.

The cylinder 50 is then placed around a coiling mandrel 52 of the desired diameter. The operator then rotates the cylinder 50 until the loops and valleys are juxtaposed to each other and the cylinder is compacted in this arrangement as illustrated in FIGURE 2. Thereafter, wire clips 54, 56 and 58 are applied to maintain the cylinder 50 in this predetermined relationship. A greater or lesser number of wire clips may be provided as desired, but generally at least two wire clips should be used.

Thereafter, the cylinder 50 is placed on a rack having other such cylinders previously formed. The rack of such cylinders is then subjected to heat treatment. The heat treatment includes subjecting the cylinders 50 to a neutral salt bath 60 for a suitable period of time to relieve stresses in the ribbon and establish the shape desired. For example, salt bath 60 may comprise a salt bath at 1500° F. for seven minutes, with said bath being composed of salt having a melting point of approximately 900° F.

The cylinders 50 are then subjected to a tempering salt bath 62 for a suitable period of time. Salt bath 62 may be a salt bath at 600° F. for fourteen minutes and be composed of salt which has a melting temperature of approximately 300° F. Thereafter, the cylinders 50 may be subjected to air cooling for a suitable period of time at cooling station 64. A suitable air cooling period may be two minutes.

After being air cooled at station 64, the cylinders 50 may then be subjected to a quench 66. The quenching medium may be any suitable liquid such as hot water at approximately 150° F. After quench 66, the cylinders 50 may be subjected to a rust preventative dip 68 and then permitted to air dry at station 70. The dry cylinders 50 may then be painted by providing an axially directed stripe at paint station 72. The axially directed stripe defines the cutting zone and also provides for a color code and installation guide. For example, the color code may designate that the rings are standard size, over size, etc. The cutting is performed at a cutting station 74 and a station 76 is provided for removing burrs from the thusly cut ribbon.

The cylinders 50 having a paint stripe thereon are then mounted at a suitable fixture and cut at station 74 along the paint stripe with a blade having a thickness corresponding generally to the radius of the loops on the sinusoidally shaped ribbon 31. The cutting step forms a plurality of ring-shaped expanders 78 corresponding in number to the number of tiers on the cylinders 50. For purposes of illustration, there is superimposed on the cylinder 50 in FIGURE 2, a cutting zone designated generally as 84. When the cylinder 50 is cut along the cutting zone 84, the free ends 80 and 82 are discarded as scrap.

Thereafter, the cylinder 50 having the axially directed cut has the burrs removed from the inner peripheral surface of the cylinder 50 in a conventional manner. Thereafter, the wire clips are removed and the free ends 86 and 88 of the expander 78 will be in abutting contact. Thereafter, any inspection and quality control steps may be performed as desired. Those expanders which satisfactorily pass the inspection and quality control steps are then ready for packaging.

The high carbon steel ribbon used in the process of this invention is preferably SAE 1078. Other similar suitable materials may be used without departing from the scope of this invention.

The present invention may be embodied in other specific forms without departing from the spirit or essential attributes thereof and, accordingly, reference should be made to the appended claims, rather than to the foregoing specification as indicating the scope of the invention.

I claim:

1. A method of making a piston ring expander comprising the steps of feeding metallic ribbon to a pre-form device, rough forming the ribbon by bending it into a sinusoidal shape, feeding the rough-formed ribbon to a finishing device, finish-forming the thusly formed ribbon to a desired sinusoidal shape, coiling the finish-formed sinusoidally shaped wire into a cylindrical coil of ribbon, cutting the ribbon to separate the ribbon from the cylindrical coil of ribbon, aligning the tiers on said cylindrical coil so that all valleys are aligned, heat treating the thusly shaped cylindrical coil of ribbon to relieve stresses, establish shape, and temper the sinusoidally shaped ribbon, and then cutting the cylindrical coil of ribbon in an axial direction to define a plurality of ring shaped expanders.

2. A method in accordance with claim 1 including stretching the finish-formed ribbon, grinding a flat on the sinusoidally shaped ribbon after it is stretched and before it is coiled, and attaching members to the cylindrical coil of ribbon to maintain the same in assembled disposition prior to the heating step and after the coiling step so that the loops and valleys maintain their juxtaposed disposition during the heat treatment step.

3. A method in accordance with claim 1 wherein said heat treatment step includes subjecting the cylindrical coil of ribbon to a neutral salt bath at a temperature of approximately 1500° F. for a period of approximately 7 minutes.

4. A method in accordance with claim 3 wherein said heat treatment step also includes subjecting the cylindrical coil of ribbon to a tempering salt bath after the neutral salt bath, and quenching the cylindrical coil of ribbon after the tempering salt bath.

5. A method of making an expander comprising the steps of unwinding high carbon steel ribbon from a spool, feeding said ribbon to a pre-form device, rough forming the ribbon into a sinusoidal shape, feeding the rough formed ribbon to a finishing device, finish-forming the rough formed ribbon to a desired sinusoidal shape, stretching the thusly formed sinusoidally shaped ribbon to attain the desired pre-opening, continuously coiling the ribbon to form a cylindrical coil of ribbon, cutting the ribbon to separate said ribbon from the cylindrical coil of ribbon, arranging the loops and valleys on the cylindrical coil of ribbon so that the loops and valleys in the various tiers of ribbon are juxtaposed to each other, attaching means to the thusly formed cylindrical coil of ribbon to maintain the loops and valleys in such juxtaposition, then heat treating the cylindrical coil of ribbon to relieve stresses and temper the cylindrical coil of ribbon, and cutting the cylindrical coil of ribbon in an axial direction to form a plurality of ring-shaped members.

6. A method in accordance with claim 5 wherein said heat treating steps include subjecting the cylindrical coil of ribbon to a neutral salt bath at a temperature of approximately 1200° F. to 1600° F.

7. A method in accordance with claim 5 including the step of griding flats at corners of the sinusoidally shaped ribbon prior to the coiling step.

8. A method comprising the steps of unwinding high carbon steel ribbon from a spool, feeding said ribbon to a pre-form device, rough forming the ribbon into a sinusoidal shape, feeding the rough formed ribbon to a finishing device, finish forming the ribbon to a desired sinusoidal shape, stretching the thusly formed ribbon to attain a desired pre-opening and imparting permanent set (grinding flats on the corners of the thusly formed ribbon, coiling the ribbon to continuously form a cylindrical coil of ribbon, arranging the tiers of ribbon so that all loops and valleys thereof are aligned, clipping the tiers together to maintain said alignment, heat treating the cylindrical coil of ribbon, painting an axial stripe for color code and installation guide on the heat treated cylindrical coil of ribbon, cutting the cylindrical coil of ribbon along the painted axial stripe, and then separating the cut cylindrical coil of ribbon into a plurality of ring-shaped expanders which are resilient and have their free ends in abutting contact.

9. A method of making a piston ring expander comprising the steps of feeding an endless metallic ribbon to a forming device, continuously forming the ribbon into a sinuoidal shape, continuously coiling the sinusoidal ribbon into a cylindrical coil of ribbon, cutting the endless ribbon to separate the endless ribbon from the cylindrical coil, aligning all loops in the various tiers of the cylindrical coil, heat treating the thusly shaped cylindrical coil, and then substantially simultaneously converting the cylindrical coil into a plurality of ring-shaped expanders and coiling said endless ribbon to form additional cylindrical coils of ribbon.

References Cited by the Examiner

UNITED STATES PATENTS

| | | | |
|---|---|---|---|
| 1,741,905 | 12/1929 | Beck | 277—160 X |
| 2,076,539 | 4/1937 | Bowers | 29—156.61 |
| 2,296,463 | 9/1942 | Bowers | 29—156.6 |
| 2,378,058 | 6/1945 | Blumensaadt. | |
| 2,697,865 | 12/1954 | Norton | 29—156.6 X |
| 2,880,861 | 4/1959 | Sklar et al. | 29—173 X |
| 2,904,377 | 9/1959 | Endres et al. | 267—1.5 X |

JOHN F. CAMPBELL, *Primary Examiner.*

J. D. HOBART, *Assistant Examiner.*